(No Model.)

G. M. ANDERSSON.
CENTRIFUGAL BUTTER EXTRACTOR.

No. 520,131. Patented May 22, 1894.

Witnesses
Geo. W. Breck
C. E. Ashley

Gustaf M. Andersson
Inventor

By his Attorneys
Witter & Kenyon

UNITED STATES PATENT OFFICE.

GUSTAF M. ANDERSSON, OF NEWARK, NEW JERSEY, ASSIGNOR TO THE UNITED STATES BUTTER EXTRACTOR COMPANY, OF NEW YORK, N. Y.

CENTRIFUGAL BUTTER-EXTRACTOR.

SPECIFICATION forming part of Letters Patent No. 520,131, dated May 22, 1894.

Application filed August 28, 1890. Serial No. 363,365. (No model.)

*To all whom it may concern:*

Be it known that I, GUSTAF M. ANDERSSON, a subject of the King of Sweden and Norway, and a resident of Newark, county of Essex, New Jersey, have invented certain new and useful Improvements in Centrifugal Butter-Extracting Apparatus, of which the following is a specification, reference being had to the accompanying drawings, which form a part hereof.

This invention relates to centrifugal apparatus to be employed in extracting butter from milk or cream.

The object of the invention is to provide an improved apparatus for dividing or separating or disturbing cream or thick milk so as to cause the particles of butter fat to coalesce and form palpable masses of butter.

The invention consists of the devices hereinafter described and claimed in the claims at the end of this specification.

When my entire invention is employed the perforations in the walls or ribs are arranged in successively higher planes on lines sloping upward from the axis of revolution and the adjacent perforations are located radially opposite or in a radial line with the unperforated portions of the adjacent walls or ribs.

Figure 1:
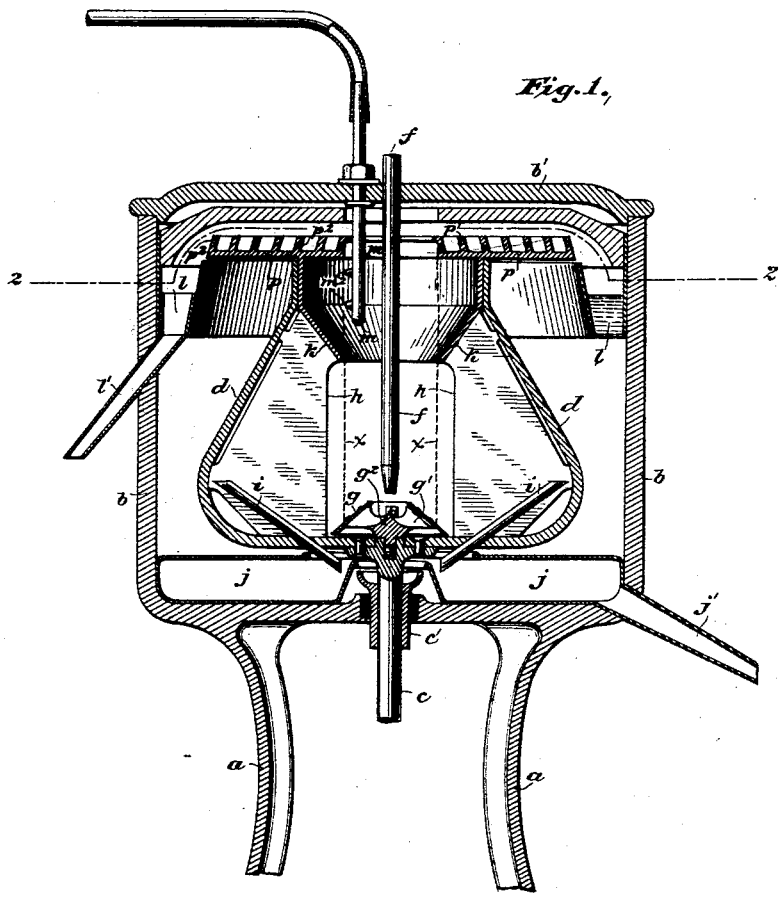
Figure 2:
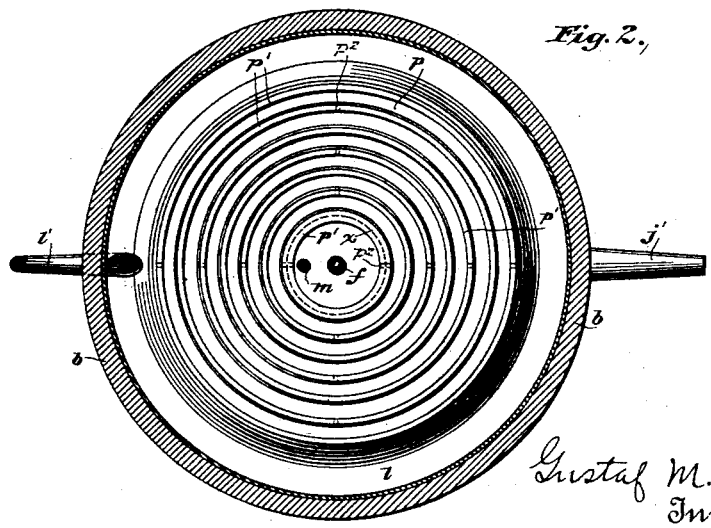

In the accompanying drawings Figure 1 is a vertical central section of an apparatus embodying my invention. Fig. 2 is a horizontal section of the same on the line 2—2, Fig. 1.

The frame of the apparatus consists of the fixed casing $b$, provided with a removable cover $b'$, and supported by a suitable base $a$ of ordinary construction, the upper portion only of which is shown. The operating shaft $c$ is arranged vertically and rotatively mounted in bearings of the usual construction. The upper bearing $c'$ is shown in Fig. 1. Its upper part is covered by a cap secured to the casing $b$.

The separating drum $d$ is securely fixed upon the upper end of the operating shaft $c$. In the operation of the apparatus this drum is revolved at a rate of from six thousand to eight thousand revolutions per minute.

The milk or cream is supplied preferably in a continuous but regulated stream, through the tube $f$, which is stationary and extends downward to the lower part of the drum. A spread cup of the construction shown and claimed in my Patent No. 487,316, is arranged at the bottom of the drum adjacent to the mouth of the tube $f$. This spread cup comprises an inclined partition $g$ supported just above the bottom of the drum with an opening all around between the lower edge of the partition and the bottom of the drum, radial blades or ribs $g'$ for imparting rotation to the fluid passing through the spread cup, and a central spreader $g^2$. The milk or cream passes down from the mouth of the feed tube $f$ to the spreader $g^2$, and is then thrown outward and revolved by the blades $g'$ and passes under the partition $g$ and out toward the periphery of the drum. Radial blades $h$ are provided in the drum $d$ to compel the liquid to partake of the revolution of the drum. The intense centrifugal force resulting from the rapid revolution of the drum causes a separation of the particles of the fluid and a re-arrangement of these particles according to their specific gravities, so that the heavy blue milk is near the periphery of the drum and the light cream is nearest the center or axis. The inner periphery of the cream wall will be about in the position indicated by the dotted lines $x$. The outlet for the blue milk is provided by the two inclined tubes $i$ extending from points within the drum near the outer wall of the drum, downwardly out of the drum. A receiver $j$ is formed in the bottom of the casing $b$, into which the blue milk passes from the mouths of the tubes $i$; and a spout $j'$ leads from this receiver out of the apparatus. An inwardly extending inclined partition $k$ preferably formed in one piece with the top of the drum and the cream disturber mounted thereon, is arranged in the upper part of the drum concentric with the drum and having its inner edge or lip about in the circle of the inner cream wall. The partition is of the construction shown and claimed in my above mentioned patent, No. 487,316. The cream flows over this partition and rises upward in the drum and flows up to the inner edge of the top of the drum and into my improved centrifugal cream disturber through perforations in the inner wall of the cream disturber, such perforations forming passages for the cream leading from the cream wall into the cream disturber.

The centrifugal cream disturber consists of a series of walls or ribs having grooves between them and perforations in the walls or ribs connecting adjacent grooves and arranged at successively increasing distances from the axis of revolution. The cream passes from groove to grooves through the perforations in the walls and is thus agitated, and this agitation causes a separation of the blue milk particles from the butter fat particles and the uniting of the butter fat particles into palpable masses of butter. The walls or ribs $p'$ are circularly and concentrically arranged and project upward from the blade $p$. The blade $p$ is mounted at the upper part of the drum and its inner portion forms the top of the drum. The ribs $p'$ are preferably inwardly inclined so that the centrifugal force tends to hold the cream at the bottom of the grooves. The inner rib $p'$ is arranged with its inner surface in the line of the inner cream wall and has an inwardly extending lip at its upper edge. Perforations $p^2$ are formed in the walls of the ribs $p'$, and these perforations conduct the fluid from groove to groove. The perforations $p^2$ of the inner rib $p'$ will be about in the line of the inner cream wall and the separated cream will flow out from the drum through these perforations. The perforations of the next rib farther from the axis are arranged radially opposite or in radial line with an unperforated portion of the inner rib and of the next outer rib, and thus the cream will be compelled to traverse a portion of the intervening groove before it can pass outward through these perforations to the next groove. This arrangement of the perforations is continued throughout the cream disturber so that the cream is compelled to circulate to some extent in each groove before it can pass to the next groove and is thrown radially outward through the perforations and against an unperforated portion of the next outer rib. The perforations $p^2$ are arranged in successively higher planes on lines sloping outward from the axis of revolution so that the cream or butter is caused to mount higher before it can escape into the next groove as it passes outward away from the axis. This construction therefore insures that the cream or butter will be retained successively by each groove before it escapes to the next succeeding groove. From the perforations in the outer rib the now separated butter passes into the butter receiver $l$, which is fixed in the upper part of the casing $b$ and has a spout $l'$ which conveys the butter out of the apparatus.

The fluid supply device consists of a duct provided with one or more nozzles arranged so as to supply a lubricating and temperature regulating fluid, such as water, brine or milk, to the cream adjacent to the cream disturber. This fluid supply duct consists of a pipe $m$ held in the top $b'$ of the casing and extending downward into the drum and provided with one or more nozzles $m^2$, arranged just below the inner edge at the top of the drum. This fluid can be supplied at any desired temperature, and thus the temperature of the cream can be regulated. It also acts efficiently as a lubricant and prevents the particles and masses of butter from adhering to the ribs or clogging the perforations.

It is obvious that parts of my invention may be separately used. The cream disturber may be used without the drum or with a drum of different construction.

The fluid supply device and inwardly extending partition in the upper part of the drum are claimed in my above mentioned patent, No. 487,316, and are not therefore separately claimed herein. The spread cup is also claimed in such patent and is not therefore claimed herein.

What I claim, and desire to secure by Letters Patent, is—

1. In a centrifugal butter extracting apparatus, a centrifugal cream disturber fitted to rotate consisting of a series of walls or ribs arranged with intervening spaces at successively increasing distances from the axis of revolution, and having perforations therein connecting the adjacent spaces between the walls or ribs, and arranged in successively higher planes on lines sloping upward from the axis of revolution, and means for revolving the cream disturber, substantially as set forth.

2. In a centrifugal butter extracting apparatus, a centrifugal cream disturber fitted to rotate consisting of a series of walls or ribs arranged with intervening spaces at successively increasing distances from the axis of revolution and having perforations therein connecting the adjacent spaces between the walls or ribs, and arranged in successively higher planes on lines sloping upward from the axis of revolution, and means for revolving the cream disturber, in combination with a fluid supply duct provided with one or more nozzles arranged adjacent to the cream disturber, substantially as set forth.

3. In a centrifugal butter extracting apparatus, a centrifugal cream disturber fitted to rotate consisting of a series of walls or ribs arranged with intervening spaces at successively increasing distances from the axis of revolution and having perforations therein connecting the adjacent spaces between the walls or ribs, such perforations being radially opposite unperforated portions of adjacent walls or ribs, and means for revolving the cream disturber, substantially as set forth.

4. In a centrifugal butter extracting apparatus, a centrifugal cream disturber fitted to rotate consisting of a series of walls or ribs arranged with intervening spaces at successively increasing distances from the axis of revolution and having perforations therein connecting the adjacent spaces between the walls or ribs, such perforations being radially opposite unperforated portions of adjacent walls or ribs, and means for revolving the cream disturber, in combination with a fluid supply duct provided with one or more nozzles arranged adjacent to the cream disturber, substantially as set forth.

5. In a centrifugal butter extracting apparatus, a centrifugal cream disturber fitted to rotate consisting of a series of walls or ribs arranged with intervening spaces at successively increasing distances from the axis of revolution, and having perforations therein connecting the adjacent spaces between the walls or ribs and arranged in successively higher planes on lines sloping upward from the axis of revolution, such perforations being radially opposite unperforated portions of adjacent walls or ribs, and means for revolving the cream disturber, substantially as set forth.

6. In a centrifugal butter extracting apparatus, a centrifugal cream disturber fitted to rotate consisting of a series of walls or ribs arranged with intervening spaces at successively increasing distances from the axis of revolution, and having perforations therein connecting the adjacent spaces between the walls or ribs and arranged in successively higher planes on lines sloping upward from the axis of revolution, such perforations being radially opposite unperforated portions of adjacent walls or ribs, and means for revolving the cream disturber, in combination with a fluid supply duct provided with one or more nozzles arranged adjacent to the cream disturber, substantially as set forth.

7. In a centrifugal butter extracting apparatus, the combination with the drum and means for revolving it, of a cream disturber arranged to revolve with the drum and consisting of a series of walls or ribs arranged with intervening spaces at successively increasing distances from the axis of revolution, and having perforations therein connecting the adjacent spaces between the walls or ribs, a fluid supply duct provided with one or more nozzles arranged adjacent to the cream disturber, one or more passages leading from the inner cream wall of the drum to the cream disturber, and one or more outlets for the blue milk, substantially as set forth.

8. In a centrifugal butter extracting apparatus, the combination with the drum and means for revolving it, of a cream disturber arranged to revolve with the drum and consisting of a series of walls or ribs arranged with intervening spaces at successively increasing distances from the axis of revolution, and having perforations therein connecting the adjacent spaces between the walls or ribs, and arranged in successively higher planes on lines sloping upward from the axis of revolution, one or more passages leading from the inner cream wall of the drum to the cream disturber, and one or more outlets for the blue milk, substantially as set forth.

9. In a centrifugal butter extracting apparatus, the combination with the drum and means for revolving it, of a cream disturber arranged to revolve with the drum and consisting of a series of walls or ribs arranged with intervening spaces at successively increasing distances from the axis of revolution, and having perforations therein connecting the adjacent spaces between the walls or ribs and arranged in successively higher planes on lines sloping upward from the axis of revolution, a fluid supply duct provided with one or more nozzles arranged adjacent to the cream disturber, one or more passages leading from the inner cream wall of the drum to the cream disturber, and one or more outlets for the blue milk, substantially as set forth.

10. In a centrifugal butter extracting apparatus, the combination with the drum and means for revolving it, of a cream disturber arranged to revolve with the drum and consisting of a series of walls or ribs arranged with intervening spaces at successively increasing distances from the axis of revolution, and having perforations therein connecting the adjacent spaces between the walls or ribs, such perforations being radially opposite unperforated portions of adjacent walls or ribs, one or more passages leading from the inner cream-wall of the drum to the cream disturber, and one or more outlets for the blue milk, substantially as set forth.

11. In a centrifugal butter extracting apparatus, the combination with the drum and means for revolving it, of a cream disturber arranged to revolve with the drum and consisting of a series of walls or ribs arranged with intervening spaces at successively increasing distances from the axis of revolution, and having perforations therein connecting the adjacent spaces between the walls or ribs, such perforations being radially opposite unperforated portions of adjacent walls or ribs, a fluid supply duct provided with one or more nozzles arranged adjacent to the cream disturber, one or more passages leading from the inner cream wall of the drum to the cream disturber, and one or more outlets for the blue milk, substantially as set forth.

12. In a centrifugal butter extracting apparatus, the combination with the drum and means for revolving it, of a cream disturber arranged to revolve with the drum and consisting of a series of walls or ribs arranged with intervening spaces at successively increasing distances from the axis of revolution, and having perforations therein connecting the adjacent spaces between the walls or ribs and arranged in successively higher planes on lines sloping upward from the axis of revolution, such perforations being radially opposite unperforated portions of adjacent walls or ribs, one or more passages leading from the inner cream wall of the drum to the cream disturber, and one or more outlets for the blue milk, substantially as set forth.

13. In a centrifugal butter extracting apparatus, the combination with the drum and means for revolving it, of a cream disturber arranged to revolve with the drum and consisting of a series of walls or ribs arranged with intervening spaces at successively increasing distances from the axis of revolution, and having perforations therein connecting the adjacent spaces between the walls or ribs and arranged in successively higher planes on lines sloping upward from the axis of revolution, such perforations being radially opposite unperforated portions of adjacent walls or ribs, a fluid supply duct provided with one or more nozzles arranged adjacent to the cream disturber, one or more passages leading from the inner cream wall of the drum to the cream disturber, and one or more outlets for the blue milk, substantially as set forth.

14. In a centrifugal butter extracting apparatus, a centrifugal cream disturber fitted to rotate consisting of a series of concentric circular walls or ribs arranged with intervening spaces at successively increasing distances from the axis of revolution, and having perforations therein connecting the adjacent spaces between the circular walls or ribs, and means for revolving the cream disturber, substantially as set forth.

15. In a centrifugal butter extracting apparatus, a centrifugal cream disturber fitted to rotate consisting of a series of concentric circular walls or ribs arranged with intervening spaces at successively increasing distances from the axis of revolution, and having perforations therein connecting the adjacent spaces between the circular walls or ribs, and means for revolving the cream disturber, in combination with a fluid supply duct provided with one or more nozzles arranged adjacent to the cream disturber, substantially as set forth.

16. In a centrifugal butter extracting apparatus, a centrifugal cream disturber fitted to rotate consisting of a series of concentric circular walls or ribs arranged with intervening spaces at successively increasing distances from the axis of revolution, and having perforations therein connecting the adjacent spaces between the circular walls or ribs, and arranged in successively higher planes on lines sloping upward from the axis of revolution, and means for revolving the cream disturber, substantially as set forth.

17. In a centrifugal butter extracting apparatus, a centrifugal cream disturber fitted to rotate consisting of a series of concentric circular walls or ribs arranged with intervening spaces at successively increasing distances from the axis of revolution, and having perforations therein connecting the adjacent spaces between the circular walls or ribs, such perforations being radially opposite unperforated portions of adjacent circular walls or ribs, and means for revolving the cream disturber, substantially as set forth.

18. In a centrifugal butter extracting apparatus, a centrifugal cream disturber fitted to rotate consisting of a series of concentric circular walls or ribs arranged with intervening spaces at successively increasing distances from the axis of revolution, and having perforations therein connecting the adjacent spaces between the circular walls or ribs and arranged in successively higher planes on lines sloping upward from the axis of revolution, such perforations being radially opposite unperforated portions of adjacent circular walls or ribs, and means for revolving the cream disturber, substantially as set forth.

19. In a centrifugal butter extracting apparatus, a centrifugal cream disturber fitted to rotate consisting of a series of concentric circular walls or ribs arranged with intervening spaces at successively increasing distances from the axis of revolution, and having perforations therein connecting the adjacent spaces between the circular walls or ribs and arranged in successively higher planes on lines sloping upward from the axis of revolution, such perforations being radially opposite unperforated portions of adjacent circular walls or ribs, and means for revolving the cream disturber, in combination with a fluid supply duct provided with one or more nozzles arranged adjacent to the cream disturber, substantially as set forth.

20. In a centrifugal butter extracting apparatus, the combination with the drum and means for revolving it, of a cream disturber arranged to rotate with the drum and consisting of a series of concentric circular walls or ribs arranged at successively increasing distances from the axis of revolution, and having perforations therein connecting the adjacent spaces between the circular walls or ribs and arranged in successively higher planes on lines sloping upward from the axis of revolution, such perforations being radially opposite unperforated portions of adjacent circular walls or ribs, one or more passages leading from the inner cream wall of the drum to the cream disturber, and one or more outlets for the blue milk, substantially as set forth.

21. In a centrifugal butter extracting apparatus, the combination with the drum and means for revolving it, of a cream disturber arranged to rotate with the drum and consisting of a series of concentric circular walls or ribs arranged at successively increasing distances from the axis of revolution, and having perforations therein connecting the adjacent spaces between the circular walls or ribs and arranged in successively higher planes on lines sloping upward from the axis of revolution, such perforations being radially opposite unperforated portions of adjacent circular walls or ribs, a fluid supply duct provided with one or more nozzles arranged adjacent to the cream disturber, one or more passages leading from the inner cream wall of the drum to the cream disturber, and one or more outlets for the blue milk, substantially as set forth.

22. In a centrifugal butter extracting apparatus, the combination with the drum and means for revolving it, of the cream disturber consisting of the plate $p$, attached to the drum and the inner portion of which forms the top of the drum, and the series of inwardly inclined concentric circular ribs $p'$, projecting upward from the plate $p$, and having perforations $p^2$ therein connecting the adjacent spaces between the walls or ribs, substantially as set forth.

23. In a centrifugal butter extracting apparatus, the combination with the drum and means for revolving it, of the cream disturber consisting of the plate $p$, attached to the drum and the inner portion of which forms the top of the drum, and the series of inwardly inclined concentric circular ribs $p'$, projecting upward from the plate $p$, and having perforations $p^2$ therein connecting the adjacent spaces between the walls or ribs, the perforations of the inner rib $p'$ being arranged in the line of the inner cream wall of the drum, the inwardly extending partition $k$, within the drum, and the fluid supply duct $m$, having nozzles $m^2$ arranged above the partition $k$, substantially as set forth.

GUSTAF M. ANDERSSON.

Witnesses:
EDWIN SEGER,
WILLIAM G. WEINBERG.